May 9, 1950          W. E. DOLE, JR          2,507,436
VEHICLE HEADLIGHT CONTROL SYSTEM
Filed Nov. 30, 1949
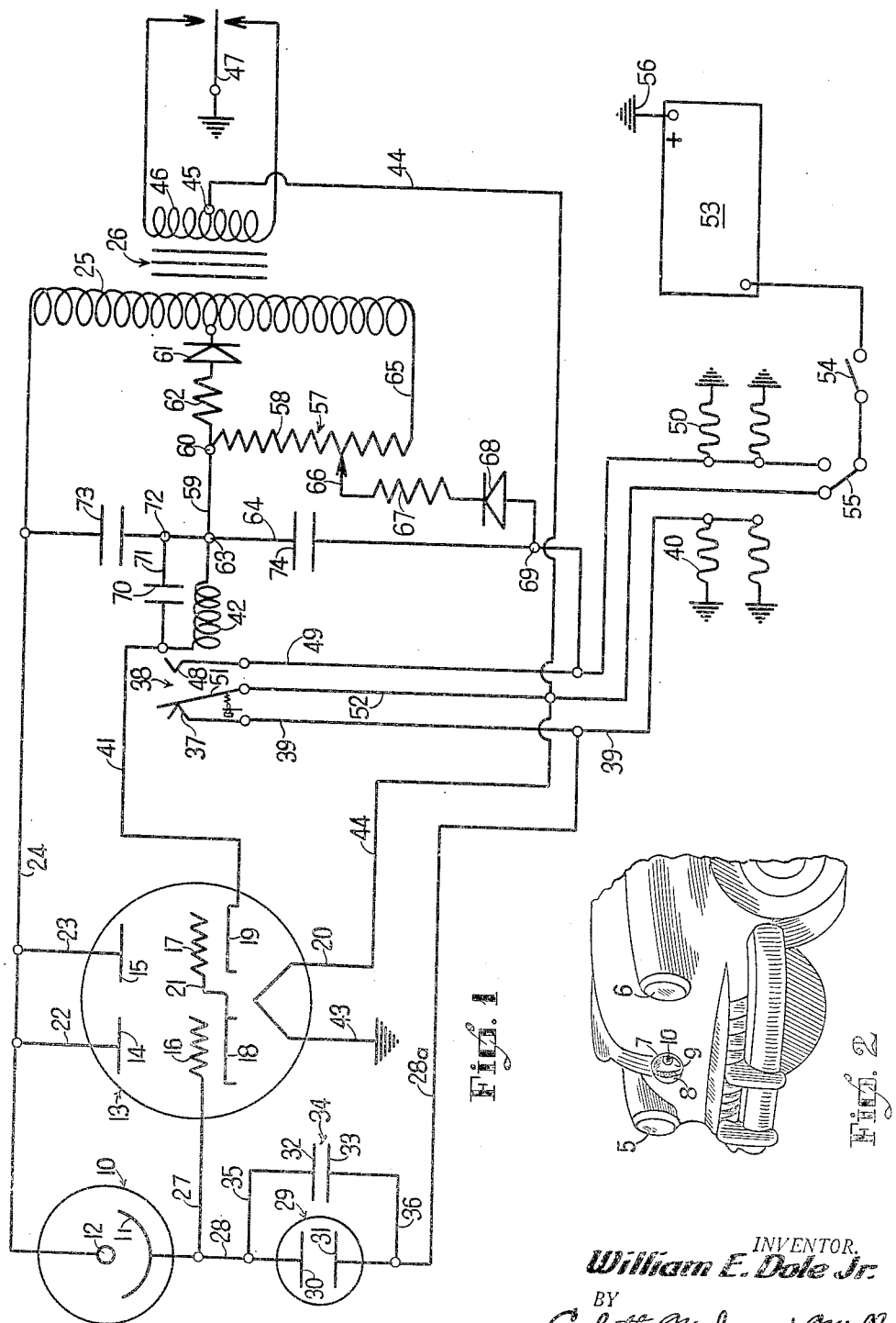
INVENTOR.
*William E. Dole Jr.*
BY
*Corlett, Mahoney & Miller*
ATTORNEYS Patented May 9, 1950

2,507,436

UNITED STATES PATENT OFFICE 2,507,436

VEHICLE HEADLIGHT CONTROL SYSTEM

William E. Dole, Jr., Oak Hill, Ohio, assignor of one-fourth to David Delaney, one-fourth to Roscoe Kearn, and one-fourth to Moffat Edwards, Oak Hill, Ohio Application November 30, 1949, Serial No. 130,162

9 Claims. (Cl. 315—83)

My invention relates to a vehicle headlight control system. It has to do, more particularly, with an electrical control system which functions automatically to control the headlights of a vehicle equipped with such system, such as an automobile or truck, in accordance with the brightness of the lights of an approaching vehicle.

Various types of electrical systems have been provided in the prior art for controlling the headlights of a car in accordance with the condition of the headlights of an oncoming car. One disadvantage of prior art systems is that they have not been provided with effective locking means which tends to keep the lights dimmed after they have once been automatically dimmed. When a car with bright lights approaches a car equipped with a prior art automatic dimmer system, which does not lock, the lights of the latter will dim. The driver of the approaching car will usually then dim the lights of his car but they will be too far away from the other car to cause the automatic dimmer system thereof to hold its lights dim and after the lights thereof are returned to bright by the automatic system, the driver of the approaching car will no doubt return his lights to bright. The automatic dimmer system of the other car will again function to dim the lights thereof with the driver of the approaching car probably following suit. This cycle would usually be repeated several times before the two approaching cars finally pass. Needless to say, this is very objectionable. One prior art patentee has attempted to overcome this objectionable feature and has provided means for obtaining locking, only to be confronted with the problem of automatically unlocking, which he failed to solve under all conditions.

Another defect of prior art devices is that they do not provide means for preventing the system from functioning to dim the lights when subjected to relatively weak light, for short periods, such as that reflected from road signs and the backs of cars when a car, equipped with the dimmer system, is passing in the same direction. Lack of such means is especially objectionable in certain types of prior art systems where such weak light not only causes dimming of the controlled lights but also where the bright lights are not restored automatically by the control due to the fact that the intensity and duration of the reflected light would not be sufficient to do so.

Prior art systems have not functioned properly at dusk or dawn because of the effect of daylight on the system which would cause the system to dim the lights and hold them dimmed. In other words, the prior art systems are so sensitive that the small amount of daylight present at dusk or dawn would interfere with normal functioning of the control system.

Obviously, it would be desirable to provide in a headlight control system of the general type indicated, means whereby the distance at which such system will function to dim the lights will be reasonably uniform, regardless of whether the lights of the approaching car are on bright or on dim. Prior art systems have not been provided with such means.

It has been proposed in the past to provide a headlight control system of the general type indicated operated by a photoelectric cell which is connected to an amplifying circuit including vacuum tubes. No provision, however, has been made for limiting the plate current through the amplifier so that damage would not result in the tube or tubes in the possible event that the photoelectric cell was subjected to a very strong light, such as sunlight, while the lights of the car and hence the amplifier might be turned on in the daytime. While it is true that an amplifying tube or tubes could be used which would handle this heavy plate current, it is also true that such a tube would not be nearly as efficient as one which normally functioned at or near its maximum or rated capacity.

It is important that such a control system be simple so as to keep low the initial cost and installation and that it be highly efficient in operation because of the limited power available from the automobile electrical system for the operation of such a control system. It is desirable that the system be so designed that the usual manual control switch be available to dim the lights and that the automatic control system, at that time, be disconnected so that when driving with lights on dim for long periods of time, such as in large cities, no current will be consumed by the automatic control system and battery power will be conserved. Also, it is desirable to have the control system so designed that in case of failure of the system, full control is automatically returned to the usual manual or foot-operated dimming switch. Also, it is desirable that the system be so designed that in no case can the lights of a car equipped with such system be kept on bright if another car is approaching with dim lights. Prior art control systems have not possessed these desirable characteristics.

One of the objects of my invention is to provide a simple automatic control system for the headlights of a car or other vehicle which will function effectively to control automatically the headlights of the car equipped with such system in accordance with the brightness of the lights of an approaching vehicle.

Another object of my invention is to provide such a system which is electrically operated from the electrical system of the car but which functions so efficiently as to use a minimum amount of current from the limited available power of such electrical system of the car.

A further object of my invention is to provide an automatic headlight control system of the type indicated which is so designed that the usual manual or foot-operated dimmer switch can be used for dimming the headlights and when in dimming condition will render the automatic system inoperative in which condition it will not consume any current from the electrical power system of the car.

An additional object of my invention is to provide such an automatic control system which is so designed that in case of failure of it at any time, complete control of the headlights is returned automatically to the manual or foot-operated switches.

A further object of my invention is to provide an automatic headlight control system which is provided with effective locking means which keeps the lights of the car, equipped with such system, dimmed after they have once been automatically dimmed by the lights of an oncoming car until the two cars pass, unless the lights of the approaching car are kept on bright, when the system will unlock and permit the lights to return to bright condition or will change back and forth from bright to dim as a signalling means to the oncoming driver, depending upon the setting of the system.

Another object of my invention is to provide an automatic headlight control system of the type indicated above which is so designed that it is more sensitive to moderately quick increase in light than slow increases and, consequently, the lights of an approaching car, whether bright or dim, will cause it to function at a reasonably uniform distance because if they are on bright, there will be a gradual increase in the effect of the lights on the control system while if on dim, the control system will be subjected to the light rather suddenly.

Still another object of my invention is to provide a control system of the type indicated which will function properly even at dawn or dusk since it is provided with means for rendering it less sensitive at dusk or dawn which means is affected by the partial daylight present at such times and compensates for the effect of such daylight.

An additional object of my invention is to provide a control system of the type indicated which is sensitive to quick increases in light, such as those resulting from the approach of a car with either bright or dim lights but which is not sensitive to light of short duration such as would be encountered in connection with reflected light from objects such as road signs and the backs of cars, passing a car equipped with my system, in the same direction.

A further object of my invention is to provide a control system of the type indicated which includes a photoelectric tube affected by the lights of oncoming cars and a vacuum tube amplifying circuit controlled thereby, means being provided for limiting the plate current through the amplifier so that damage will not result in case the system is subjected to a very strong light, such as sunlight in case the system is on during the daytime.

Still another object of my invention is to provide an automatic control system for headlights which is so designed that as long as it is functioning, the lights of a car equipped with such system cannot remain on bright if another car is approaching with dim lights.

Another object of my invention is to provide such a control system which is so designed that it can be set so that the system will return to bright light condition after being set in dim light condition automatically by the approach of a car, if the oncoming car's lights are not dimmed, or it can be set so that the system will change the lights back and forth from bright to dim, in case the driver of the approaching car does not dim its lights, as a signal to such driver.

Various other objects will be apparent.

According to my invention, I provide an automatic control system for the headlights of a car which is actuated by means of a photoelectric cell suitably positioned on the front of a car where it will be affected by the lights of an oncoming car. The photoelectric cell is connected in circuit with an amplifying circuit which controls a relay switch that, in turn, is selectively operable to energize either the bright light filaments or the dim light filaments of the headlights. The amplifying circuit includes an amplifying tube which is controlled by means of a glow tube that functions to vary the resistance in such circuit and this glow tube is oscillated by means of a condenser in circuit therewith. This glow tube also makes it possible by varying the resistance of the amplifying circuit, to set the relay so that it will either return to bright light position or will change back and forth from bright to dim position if the photoelectric tube is subjected to bright light for long intervals. The grid return part of the circuit is connected to the bright and dim light filament wires in such a manner that the amplifier circuit, when actuated by light on the photoelectric cell, is locked in dim light condition until the light on such cell is terminated suddenly when it is unlocked and returned to bright condition. The condenser in the glow tube circuit and another condenser in the relay circuit will absorb or smooth out the effect of lights of short duration which it is desired not to affect the operation of the system. Associated with the power supply from the car's power system is a potentiometer which adjusts the sensitivity of the circuit. This potentiometer is supplied with alternating current rather than the usual direct current by a half-wave rectifier connected to the power receiving tap thereof. Connected to the bias voltage tap thereof is another half-wave rectifier. In addition, a bias filter condenser is provided in the bias voltage circuit connected to the potentiometer so that daylight on the photoelectric cell can be compensated for because the said condenser will make the system less sensitive when daylight is present on the photoelectric cell. The usual manual switch and foot-operated dimmer switch are connected in the circuit in such a manner that the dimmer switch can take over control of the light filaments at any time and in case of failure of the automatic part of the system, the said switches can be used for controlling the lights.

The preferred embodiment of my invention is illustrated in the accompanying drawing wherein similar characters of reference designate corresponding parts and wherein:

Figure 1 is a diagrammatic view illustrating the electrical system which I preferably provide for automatically controlling the headlights of an automobile.

Figure 2 is a schematic view illustrating how the photoelectric cell of the system is positioned on the car.

With reference to the drawing, in Figure 1, I have illustrated my electrical control system and in Figure 2 I have illustrated one example of how the photoelectric tube of the system is mounted on the car. The car is provided with the usual headlights 5 and 6 which my system controls. Preferably between the headlights and in a position to be affected by the lights of the oncoming car is a housing 7 in which the photoelectric cell 10 of the system is disposed. This housing may be similar to a headlight and preferably has a lens 8 mounted at its front side and the reflector 9 which will magnify the effect of the light of the oncoming car on the tube 10. Other arrangements may be provided, the one in Figure 2 being given merely by way of example.

The circuit of my control system is illustrated diagrammatically in Figure 1. In this diagram, the photoelectric cell is indicated generally by numeral 10 and includes the cathode 11 and the anode 12. The photoelectric cell is connected in an amplifying circuit which includes the twin triode tube 13. This tube includes the first stage plate 14 and the second stage plate 15; the first stage grid 16 and the second stage grid 17; the first stage cathode 18 and the second stage cathode 19; and the single filament 20. A direct connection 21 is provided between first stage cathode 18 and second stage grid 17. Instead of using a twin tube, I may use two single triode tubes or other suitable tubes although the twin triode is preferred. Also, more than two stages of amplification can be used. The plates 14 and 15 of tube 13 are connected by branch lines 22 and 23, respectively, to the line 24 which is connected to the anode 12 of the cell 10. The line 24 is also connected to the upper end of the secondary 25 of the transformer which is indicated generally by numeral 26. The first stage grid 16 of tube 13 is connected by branch line 27 to the line 28 which is connected to the cathode 11 of tube 10. A small glow tube 29 is interposed in the line 28, as a voltage regulator, the electrodes 30 and 31 thereof being connected in series in the line. The plates 32 and 33 of a condenser 34 which causes glow tube 29 to oscillate, are connected, respectively, by branch lines 35 and 36 to the lines 28 and 28a, respectively, which are connected to electrodes 30 and 31. The line 28a connects to line 39 which leads to one stationary contact 37 of a relay indicated generally by numeral 38. The line 39 also leads to the grounded bright light filaments 40 of the car headlights. The second stage cathode 19 of tube 13 is connected by line 41 to the coil 42 of the relay 38. The filament 20 of the tube 13 is grounded by line 43 and is connected by line 44 to the center tap 45 associated with the primary 46 of the transformer 26. The transformer is of the vibrator type and its primary 46 is connected to the grounded vibrator 47. The other stationary contact 48 of the relay 38 is connected by a line 49 to the grounded dim light filaments 50 of the car headlights. The relay armature 51, which has the usual adjustable spring associated therewith, is connected by line 52 to line 44 and to the negative side of the car battery 53, the main light switch 54 being interposed in this line and the usual foot-operated dimmer switch 55 also being interposed in this line. Of course, the battery 53 will have the usual generator associated therewith and it is to be understood that the showing of the battery is intended to designate generally the low-voltage power source in the car. Battery 53 is provided with the ground connection 56. Associated with the secondary 25 of the transformer, is a potentiometer indicated generally by the numeral 57. Alternating current, rather than the conventional direct current, is supplied to the potentiometer. The upper end of the resistance coil 58 of the potentiometer is connected to line 59 at a tap 60 and between this tap and the center of the transformer secondary 25 is a half-wave rectifier 61 for power voltage filter resistor 62. Line 59 is connected at tap 63 to line 64 and is also connected to relay coil 42. The lower end of the coil 58 is connected by line 65 to the lower end of the transformer secondary 25. The movable contact arm 66, associated with the coil 58, is connected to a bias voltage filter resistor 67 which, in turn, is connected to the half-wave rectifier 68 for bias voltage that is connected to the line 64 at the point 69. The line 64 is connected at one end of the line 24 and at the other end to the line 49. A condenser 70 is interposed in line 71 which line runs from line 41 and which is conected at tap 72 to line 64 between tap 63 and its connection to line 24. In line 64, between tap 72 and its connection to line 24, a plate supply filter condenser 73 is provided. Connected in line 64 between tap 63 and tap 69 is a bias filter condenser 74.

In the circuit described above, the ground 56 for the battery 53 is positive. The electrical systems of some makes of cars at the present time do have this arrangement. However, if the electrical system of the car is so arranged that the ground 56 is the negative, my circuit will be changed by connecting wire 64 to wire 39 and wire 28a to wire 49, other connections remaining as shown.

This circuit will function as follows: When light falls upon the cathode 11 of the photoelectric cell 10, it causes grid 16 of the first stage of amplifier tube 13 to become positive in the known way which, in turn, causes the cathode 18 of the first stage to become positive, although to a less degree than the first stage grid 16. Since the first stage cathode 18 and second stage grid 17 are directly conected by connection 21, the grid 17 also becomes a positive with respect to the second stage cathode 19. This causes current to flow between second stage plate 15 and second stage cathode 19, through line 41 and then through coil 42 of relay 38. Energizing relay coil 42 causes armature 51 to move into engagement with relay contact 48, which causes current to flow into line 49 and through the dim headlight filaments 50. It will be noted that the electron stream between the first stage cathode 18 and the filament 20, although of very high resistance, is utilized as a grid leak or resistance for the second stage amplification.

The small glow tube 29 serves as a grid leak or resistor for the first stage amplification, and with no light on the cathode 11 of the photoelectric cell 10, the voltage on the glow tube is less than that required for it to glow. Under this condition, the resistance of the glow tube is very high and, consequently, causes little load on the photoelectric cell. However, when a given amount of light falls on the cathode 11 of the photoelectric cell, the glow tube 29 glows, resulting in a great decrease in resistance of it to a low value. This feature, definitely limits current on plates 14 and 15, regardless of how much light may fall on the photoelectric cell 10 and, in addition, tends to return grids 16 and 17 to stand-by voltages, due to ionization in the glow tube 29.

It should be noted, that the above feature of limiting plate current is easily obtained in my electrical system, due to the fact that the voltage swing or change on the glow tube 29 is equal to the sum of the voltage changes on both grids 16 and 17. In other words, the glow tube swing or voltage change is equal to the swing or voltage change of the first stage grid 16 with respect to the second stage cathode 19. This holds true so far as the description of operation of my system up to this point is concerned, although slight deviation may occur under other conditions which will be described below. Also, there is actually a cut-back in glow tube voltage and hence, grid positive voltage, when the glow tube starts to glow and, consequently, a resulting cut-back in plate current. This means that the tension of the spring associated with the armature 51 of relay 38, can be so adjusted that the armature will return to bright position, where it engages relay contact 37, when enough light falls on the photoelectric cell 10 to raise the voltage of glow tube 29 to the glow point. Since relay contact 37 is connected to bright light filaments 40 by line 39, this fact affords a means of causing the previously automatically dimmed lights to be returned to bright condition, if desired, when the driver of the approaching car does not dim his lights. On the other hand, due to the fact, that condenser 33 causes glow tube 29 to oscillate, an adjustment of the relay spring can be found whereby the lights will change back and forth from bright to dim, in case the approaching driver does not dim his lights. Due to the fact that very high resistance grid leaks are used, the value of the bias voltage used is almost as high as the plate voltage.

As previously indicated, I provide means for locking the amplifying circuit to keep the lights dim after they once are dimmed by the effect of the lights of the approaching car, until such car has passed. With my electrical system, two methods of locking the amplifier are afforded by connecting the grid return circuit to the light lines 39 and 49, as shown. The line 64 is connected to the light lines 39 and 49 in such a way that the voltage of the battery 53 is added to the bias voltage at stand-by or bright light position of the relay. A study of this connection will reveal that due to car battery polarity being reversed in the grid return circuit, when relay armature 51 moves to dim light relay contact 48, the bias voltage is made less by double the voltage of the battery 53, so far as the first grid 16 is concerned thus establishing firm relay contact and locking the amplifier to some extent for as long as the relay is in dim light position. The wire 52, connected to relay armature 51, is always negative since it is always connected to the negative side of the battery 53. When relay armature 51 is in contact with relay contact 37, the line 39 is obviously negative and the line 49 is positive due to the fact that it is grounded through the dim headlight filaments 50. On the other hand, when relay armature 51 is in contact with relay contact 48, the line 49 is negative and the line 39 is positive due to the fact that it is grounded through the bright headlight filaments 40. So far as the bias voltage change, due to relay contact shift, on the second stage grid leak (electron stream between filament 20 and cathode 18) is concerned, the line 52 is always negative and is the same potential with respect to filament 20, the only change of bias voltage on the second stage grid leak (electron stream between filament 20 and cathode 18), so far as it is caused by relay contact shift, since the change in the line 39 is eliminated, is equal to the change in potential of the line 49, total change being equal to car battery voltage.

It is to be understood that due to very high resistance grid leaks, the voltage change on the grids 16 and 17, due to relay contact shift, is much less than the above-mentioned bias voltage change. In addition to this, there is a positive voltage surge on the grids, which is equal to twice the car battery voltage on the first grid, but which is of short duration, lasting only until the condenser 32, connected to glow tube 29, can change its potential. Although this voltage surge is of short duration, its effect is of longer duration, due to ionization in tube 13 and rather intense magnetic flux created in relay coil 42 and current stored in condenser 70. When light on the photoelectric cell 10 is terminated, these two locking processes work in reverse as soon as relay armature 51 starts to return to contact 37 or bright light position, thus affording a clean quick contact shift.

Although the reflected light, from road signs and backs of cars passing a car, equipped with my dimmer system, in the same direction and acting on the photoelectric cell 10 might be intense enough to operate the dimmer system, it acts on the cell for only short intervals of time, and consequently, the condensers 34 and 70 will absorb or smooth out the effects of such light and thus avoid dimming from such causes.

As previously indicated, the bias voltage output section of the power supply is unusual in that alternating current, rather than the conventional direct current, is supplied to the potentiometer 57. The high resistance of the potentiometer causes some load on the transformer 26 during the unused half of each A. C. cycle, thereby contributing to a smoother bias voltage. It should be noted that the upper end of the potentiometer coil 58 is connected to the center of the transformer secondary 25 through rectifier 68 only during the unused half of the cycle, the only connection on the used half of the cycle being through plate supply filter condenser 73. As the light on the photoelectric cell 10 and hence the plate current increases, the plate voltage drops, due to voltage drop of rectifier 61 and resistor 62. This causes an increase in bias voltage with an increase in plate current. This bias voltage increase lags behind the plate current increase, due to the time it takes bias filter condenser 74 to charge and, therefore, affects sensitivity very little. However, the increased bias voltage, at the time of passing the oncoming car, assures a quick return of bright lights, due to the fact that light on the photoelectric cell 10 is terminated rather suddenly before sufficient time has elapsed to permit bias condenser 74 to discharge and lower bias voltage.

An exception to the above statement regarding very little sensitivity change would occur at dusk or dawn. In that case, the bias filter condenser 74 would have time to assume the potential of the potentiometer 57 with the following result: Due to some daylight on the photoelectric cell, the stand-by plate current would be higher than at night and hence, plate voltage would be lower, which would result in higher stand-by bias voltage as explained above. The higher stand-by bias voltage would make the dimmer system less sensitive to light and thereby compensate for the effect of daylight. This would result in the dimmer system properly functioning at dusk or dawn when otherwise it would simply hold lights on dim.

Due to the fact that the system is more sensitive to moderately quick increases in light than to slow increases, the distance from an approaching car at which the system will function to dim the lights, remains reasonably uniform regardless of whether the approaching lights are on dim or on bright. Obviously, if the lights of the approaching car are on bright, the photoelectric cell 10 is subjected to a rather gradual increase in light, while if such lights are on dim, the photoelectric cell comes into the beam rather suddenly.

In case of failure of the dimmer system, full control of the lights is automatically returned to manual switch 54 or foot-operated switch 55.

With the dimmer system as shown, no current is consumed when dimmer switch 55 is in dimming position. This feature permits conservation of battery power when driving with lights on dim for long periods of time, such as in large cities. In other words, when the lights are dimmed with the usual manual or foot-operated switch, the automatic dimmer system is disconnected.

In no case will the lights of a car equipped with this dimmer system which is properly functioning, be kept on bright, if another car is approaching with dim lights.

Although I have described my dimmer system, as controlling bright and dim light filaments, it should be understood that it can control other types of lighting circuits including different means selectively variable to provide either dim or bright illumination on the road, for example, a lighting circuit wherein both sets of filaments are of the same brightness but there is a difference in direction of the light beams from the two sets of filaments.

It will be apparent from the above description that I provided a simple and inexpensive headlight control system which is actuated automatically to effectively control the headlights in accordance with the condition of the lights of an approaching car. Although, the system is electrical and is actuated by the power system of a car equipped therewith, it uses a minimum amount of current and will not be an excessive drain in the limited available power of the electrical system of the car. Many advantages of my automatic control system have been discussed above and others will be apparent.

Having thus described my invention, what I claim is:

1. An electrical system including a circuit having means for obtaining both dim and bright illumination, means in said circuit for selecting either the dim or the bright illumination, means in said circuit for controlling said selecting means, said means including a photoelectric cell connected in the circuit and an automatically variable electrical resistance connected to said photoelectric cell in said circuit, said resistance being a glow tube which decreases in effect when light falls on said photoelectric cell.

2. An electrical system according to claim 1 wherein a condenser is connected in circuit with the glow tube for causing it to oscillate.

3. An electrical system according to claim 2 wherein the illumination selecting means comprises a relay connected in said circuit.

4. An electrical system according to claim 4 wherein said relay has adjustable means connected therewith tending to hold it in bright position and wherein amplifying means is connected in the circuit between said photoelectric cell and said relay.

5. An electrical system according to claim 4 wherein the armature of the relay is connected to one terminal of a power source and the bright and dim illumination means are connected to the contacts of the relay, said armature being also connected to the amplifying means, one of said contacts being connected to the glow tube, and a potentiometer connected to the other of said contacts and to said amplifying means.

6. An electrical system including means for obtaining both dim and bright illumination, a relay in said circuit for selecting either the dim or the bright illumination, said relay including a pair of contacts connected to the dim and bright illuminating means and an armature movable between said contacts, said circuit including a power supply and an amplifier, a light sensitive tube connected in said amplifying circuit for controlling said relay, said relay armature being connected to the power supply and to said amplifier, one of said relay contacts being connected to one side of said light sensitive tube and the other of said relay contacts being connected to the other side of said tube and to said power supply.

7. An electrical circuit according to claim 6 wherein a glow tube is connected in the circuit between said first-named relay contact and said light-sensitive tube.

8. An electrical system comprising a circuit including means for obtaining both dim and bright illumination, a relay in said circuit for selecting either the dim or the bright illumination, said relay including a pair of contacts connected to the dim and bright illuminating means and an armature movable between said contacts, means for controlling said armature and including a photoelectric cell and an amplifier tube of the twin triode type, a line connecting the cathode of the photoelectric tube with one of said relay contacts and having a branch line connecting said cathode with the first stage grid of said tube, a line connecting said relay armature to one terminal of a battery and a branch line connecting said armature to the filament of said tube, a line connecting said armature with the primary of a transformer, a line connecting one end of the secondary of the transformer to the anode of said photoelectric cell and having branch lines connecting it to the plates of said tube, a potentiometer having a coil and a movable contact, one end of the coil being connected to the other end of said secondary and the other end of the coil being connected to the center of said secondary by means of a half-wave rectifier, a line connecting the second contact of the relay with the line which leads from the transformer secondary to the anode of said cell, a branch line leading from the movable potentiometer contact and connecting to the said line leading from the second relay contact and having a half-wave rectifier interposed therein, said second relay contact line having a pair of condensers interposed therein, a branch line leading from the end of said potentiometer coil which is connected to the center of the secondary and tapping said second relay contact line between said condensers and leading on to the second stage cathode of said tube, and a condenser connected to said branch line and to the second relay contact line between said tap and its connection to the line leading from the transformer secondary to said cell anode.

9. An electrical system according to claim 8 wherein a glow tube is interposed in the line connecting said cell cathode with said first relay contact, and a condenser for oscillating said glow tube connected to the electrodes thereof.

WILLIAM E. DOLE, Jr.

REFERENCES CITED

The following references are of record in the file of this patent:

UNITED STATES PATENTS

| Number | Name | Date |
|---|---|---|
| 2,219,976 | Berg, Jr. | Oct. 29, 1940 |
| 2,431,394 | Friedman | Nov. 25, 1947 |
| 2,476,339 | Schmidt, Jr. | July 19, 1949 |
| 2,493,307 | Moore et al. | Jan. 3, 1950 |

Certificate of Correction

Patent No. 2,507,436 — May 9, 1950

WILLIAM E. DOLE, Jr.

It is hereby certified that error appears in the printed specification of the above numbered patent requiring correction as follows:

Column 10, line 6, for the claim reference numeral "4" read *3*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*